United States Patent [19]

Hodgman et al.

[11] Patent Number: 4,628,243

[45] Date of Patent: Dec. 9, 1986

[54] BATTERY CHARGING SYSTEM HAVING MEANS FOR DISTINGUISHING BETWEEN PRIMARY AND SECONDARY BATTERIES

[75] Inventors: John S. Hodgman; Ferdinand H. Mullersman, both of Gainesville, Fla.

[73] Assignee: General Electric Company, Gainesville, Fla.

[21] Appl. No.: 659,918

[22] Filed: Oct. 11, 1984

[51] Int. Cl.$^4$ .................. H02J 7/00; H01M 10/44
[52] U.S. Cl. .......................... 320/2; 320/48; 429/7; 429/178
[58] Field of Search .................. 320/2-5, 320/13, 14, 20-24, 35, 36, 48; 429/7, 10, 92, 93, 96, 97, 176, 177, 178, 179

[56] References Cited

U.S. PATENT DOCUMENTS

| | | | |
|---|---|---|---|
| 3,070,748 | 12/1962 | Worobey et al. | 455/343 |
| 3,506,902 | 4/1970 | Sullivan | 320/2 |
| 3,622,396 | 11/1971 | Fernandez et al. | 250/215 X |
| 3,665,285 | 5/1972 | Mullersman et al. | 320/2 |
| 3,675,108 | 7/1972 | Nicholl | 320/2 |
| 3,736,489 | 5/1973 | Mullersman | 320/35 |
| 3,808,487 | 4/1974 | Feuillade | 320/21 |
| 3,816,807 | 6/1974 | Taylor | 320/48 X |
| 3,930,889 | 1/1976 | Ruggiero | 429/97 |
| 4,006,396 | 2/1977 | Bogut | 320/2 |
| 4,044,300 | 8/1977 | Dupuis et al. | 320/48 X |
| 4,147,163 | 4/1979 | Newman et al. | 320/2 X |
| 4,147,838 | 4/1979 | Leffingwell | 320/2 X |
| 4,213,079 | 7/1980 | Mullersman | 320/2 |
| 4,229,686 | 10/1980 | Mullersman | 320/2 |
| 4,288,733 | 9/1981 | Bilanceri et al. | 320/2 |
| 4,310,606 | 1/1982 | Maida | 320/48 X |
| 4,382,219 | 5/1983 | Holme et al. | 320/2 |
| 4,453,119 | 6/1984 | Staler et al. | 320/39 |

Primary Examiner—R. J. Hickey
Attorney, Agent, or Firm—Henry J. Policinski

[57] ABSTRACT

A battery charging system is provided including a charger and a rechargeable battery of "standard" size and configuration. The rechargeable battery bears a special indicia that is sensed by the charger as a precondition to enabling the charging circuit of the charger. The indicia-bearing battery can thus be used in place of "standard" non-rechargeable batteries in battery using products of various sorts, but non-rechargeable batteries, lacking the special indicia, cannot be charged in the charger. Potential damage to the charger or product and other adverse effects associated with charging of non-rechargeable batteries is thus avoided.

25 Claims, 4 Drawing Figures

BATTERY CHARGING SYSTEM HAVING MEANS FOR DISTINGUISHING BETWEEN PRIMARY AND SECONDARY BATTERIES

This invention relates to rechargeable batteries, and more particularly to a system for recharging rechargeable, or secondary, batteries but preventing the recharging of non-rechargeable, or primary batteries.

BACKGROUND OF THE INVENTION

There are available to the consumer an ever-increasing number of portable battery operated devices. Those devices create an ever-increasing demand for batteries to serve as power sources. Conventionally, primary batteries such as carbon-zinc or alkaline batteries have been used as power sources, but since these primary batteries are typically not designed for recharging, the consumer is forced to continually replace the used-up primary batteries with new fresh batteries.

Nickel-cadmium batteries are available which can repeatedly be recharged and reused for a significant number of charge/discharge cycles. Such nickel cadmium batteries are often made with a terminal and case configuration identical to that of primary batteries so as to be useable in the relatively large number of products designed to use primary batteries. These nickel cadmium batteries are usually associated with battery chargers for charging of the batteries. However, providing chargers for such nickel cadmium batteries creates the opportunity for insertion of primary batteries, having the same size and shape configuration, into the charger by an unwary consumer, even though such primary batteries are not intended to be recharged. It has been found that many carbon-zinc and alkaline batteries, if subject to charging current, will eventually release electrolyte which can corrode and damage the product into which the battery is inserted. Charging of such primary batteries may also produce other adverse effects.

In prior art approaches, in order to provide for charging of nickel-cadmium batteries while avoiding the adverse effects associated with recharging primary batteries, the nickel-cadmium batteries have been made of special size or shape to distinguish them from the non-rechargeble or primary batteries so that only the rechargeable battery will physically fit into a charger for recharging. Other prior art approaches have provided the rechargeable battery with a third contact terminal (in addition to the two contact terminals used to discharge energy from the battery) which is used to charge the battery. A non-rechargeable battery not having the third charging contact terminal cannot be charged in the charger. Another prior art approach provides for the insertion of a uni-directional current flow device into the non-rechargeable battery so that current may flow from the battery during discharge but cannot flow through the battery in the reverse direction during charging. Each of these prior art approaches has not proved to be entirely satisfactory at least for the reason that they each involve additional or special parts or components and hence increase the cost of the battery.

In view of the foregoing, it is the general purpose of the present invention to provide a rechargeable battery system including a special battery and battery charger which avoids the possibility of providing recharging current to a non-rechargeable battery. More particularly, it is an object of the invention to provide a special rechargeable battery and a battery charging system which cooperate for recharging of the special batteries by enabling the charger to deliver charge current when a special rechargeable battery is inserted therein but which prevent the charger from delivering charge current if another battery is inserted.

In practicing one aspect of the present invention, it is an object to provide a battery charging system for charging multiple batteries in which each battery is provided with an indicia indicating such battery is of the rechargeable type, and the charging system is not enabled unless each battery inserted is of the special rechargable type.

Another object of the present invention is to provide a battery system as characterized above that makes it exceedingly difficult for the consumer to override the feature of the charger which prevents charging of the primary batteries by such tactics as inserting conductive elements, for example metallic foil or the like, in the charger to bridge electrical sensing contacts.

SUMMARY OF THE INVENTION

In one form the invention provides for a rechargeable battery having first and second external load terminals for delivering electrical energy and further having indicia means for providing an indication distinguishing the rechargeable battery from a non-rechargeable battery. The invention further provides a charging device including a battery circuit having a first charging mode and a second non-charging mode. Enabling means in the charger senses the presence of the indicia on the battery and in response thereto enables the charging mode whereby the charger will be enabled to deliver charging current only by batteries of the rechargeable type.

DESCRIPTION OF THE DRAWINGS

Other objects and advantages will become apparent from the following detailed desdription when taken in conjunction with the drawings, in which.

While the invention will be described in connection with the preferred embodiments, it will be understood that we do not intend to limit the invention to those embodiments. On the contrary, we intend to cover all alternatives, modifications and equivalents as may be included within the spirit and scope of the invention as defined by the appended claims.

DESCRIPTION OF THE PREFERRED EMBODIMENTS

Figure 1:
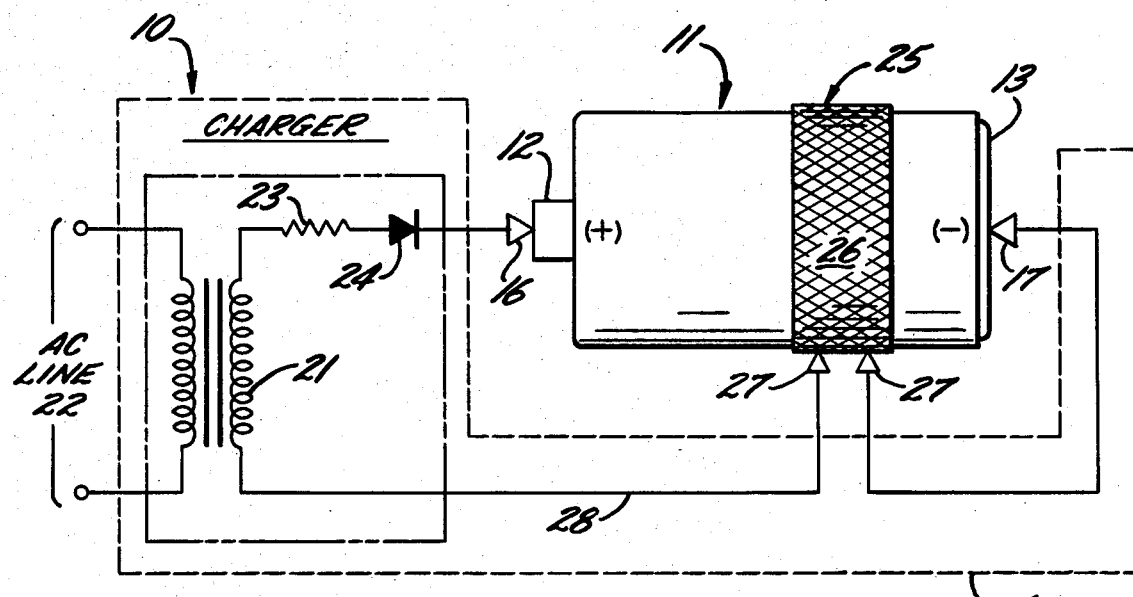
FIG. 1 is a schematic of a first embodiment of a charging system embodying the invention.

Turning to the drawings, there is shown in FIG. 1 a battery charging system including a charging device or charger 10 and a special rechargeable battery 11. The battery 11, illustrated as a standard cylindrical cell, has first and second external load terminals 12, which is the positive terminal, and 13, which is the negative terminal. The terminals 12 and 13 are provided for the purpose of connecting the cell or battery to an energy-using device for the delivery of electrical energy thereto. The charger 10 includes a case 15 for receiving the battery 11 and first and second charging contacts 16 and 17 arranged to respectively electrically contact the battery load terminals 12, 13 when the battery 11 is received in the case 15. Within the charger 10 is a transformer 21 adapted to be coupled to a conventional a-c line 22, an impedance 23 to control the charging current, and a diode 24 for half-wave rectification.

In carrying out the invention, the charger 10 has a charging mode and a non-charging mode, the battery 11 has indicia 25 on its outer surface indicating that it is a rechargeable battery, and there is enabling means in the charger remote from the contacts 16, 17 to sense the presence of the battery indicia 25 and enable the charging mode. In the embodiment of FIG. 1, the indicia 25 on the battery is a conductive band 26 surrounding the outer case of the battery and arranged on the outer case of the battery in such a manner that, when the battery does not reside in the charger 10, conductive band 26 is electrically isolated from load terminals 12 and 13. With conductive band 26 disposed in this manner, the battery will not be shorted if an electrically conductive path is established between band 26 and either one of the load terminals 12 or 13.

The charger enabling means is comprised of a pair of contacts 27 which engage the band 26 when the battery is placed in the charger. The contacts 27, when not bridged by a conductive band 26, provide an electrical discontinuity in line 28 connecting the terminal 17 with the transformer 21. With the line 28 open, no charge current can flow to the battery and the charger is in a non-charging mode. If the contacts 27 are electrically bridged by engagement with the conductive band 26, then the charger is in the charging mode and charging current is delivered directly to the battery load terminals 12 and 13.

A battery of the same size and shape as the battery 11 but without band 26, if inserted in the charger 10, would not enable the charger and would not receive current since a conductive band 26 is not present to bridge across contacts 27. Only rechargeable batteries having the indicia band 26 of the system can therefore be charged. Preferably, the band 26 is placed non-centrally of the battery so that the charging mode is not enabled if the battery is inserted in the charger in a reverse position, i.e., with the positive and negative terminals reversed from the correct polarity.

Figure 2:
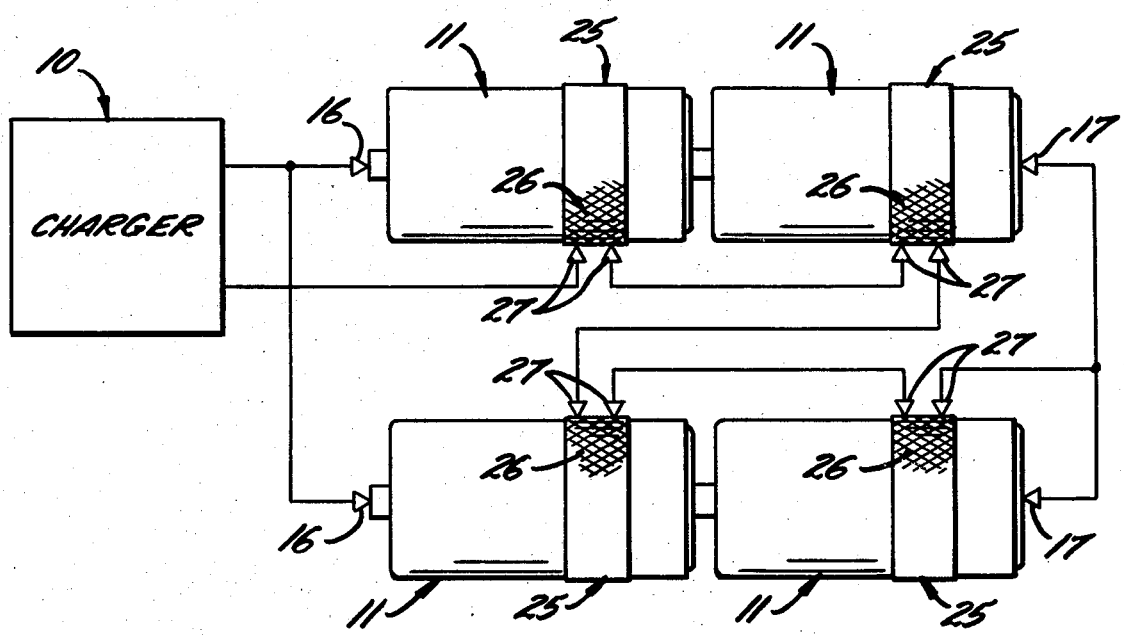
FIG. 2 is a schematic of the battery charging system of FIG. 1 embodied in a charger capable of simultaneously charging a group of batteries.

The system described is easily adapted to chargers capable of receiving a number of batteries for simultaneous charging. As shown in FIG. 2, a four-battery charging circuit requires each of the batteries 11 inserted to have the proper indicia 25 in the form of band 26 before the charging current is enabled.

Figure 3:
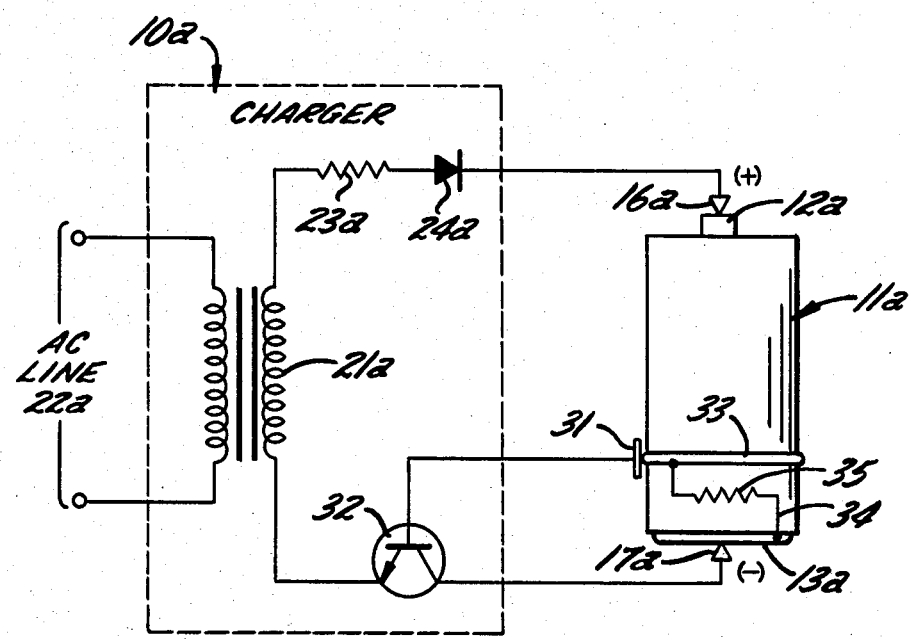
FIG. 3 is a schematic of a second embodiment of a battery charging system embodying the invention.

Another embodiment of a charging system in accordance with the invention is shown in FIG. 3 wherein the charge enabling means is a single broad contact 32 and a switch transistor 32. Other elements in this embodiment that have been described in previous embodiments have been given the same reference numerals as in the previous embodiment but with the distinguishing suffix (a) added. In this case, the battery indicia is a narrow conductive rib 33 on the battery periphery electrically connected to the negative load terminal 13a of the battery through a line 34.

When the battery is properly connected in the charger 10a, the base terminal of the transistor 32, by virtue of its connection to the enabling contact 31, will provide base current to the transistor 32, turning the transistor on and allowing charging current to flow through the rectifying diode 24a from the transformer 21a and through the battery 11a and the transistor 32. Thus, as is apparent from FIG. 3, charging current flows through a current path that does not include the indicia means (rib 33) and hence charging current is delivered to the rechargeable battery via a current path around indicia means 33. Of course, if a non-rechargeable battery, having no rib 33 electrically connected to terminal 13a, is inserted in such a charger, no base current will be provided to the transistor 32 and charging will not be enabled. The possible occurrence of a potentially adverse event associated with an attempt to charge a non-rechargeable battery is avoided.

Preferably, the electrical connecting line 34 between the rib 33 and the battery load terminal 13a includes an impedance 35. Impedance 35 is provided to insure that if a user of the battery 11a accidentally establishes a sustained electrical connection between the positive terminal 12a and the rib 33, there will be no heavy current drain from the battery as would be the case if the rib 33 was directly connected to the negative terminal 13a. Impedance 35 is also provided to prevent damage to the base-emitter junction of transistor 32 if positive terminal 12a and rib 33 are connected electrically to terminal 16a and contact 31 respectively before negative terminal 13a is connected to contact 17a.

In the embodiments so far described, a consumer may intentionally defeat or override the non-charging mode of the charging systems. More specifically, the consumer would be able to see the charger contacts 27 or 31 and surmise that he is unable to charge a primary battery not made in accordance with the system because the contacts 27 or contact 31 are not electrically engaged by conductive bands on the primary battery. By placing a piece of conductive foil or the like in the charger to bridge the contacts 27, or by connecting the contact 31 with the charging contact 17a a consumer would enable the charger's charging mode for any battery placed in the charger. The embodiment of FIG. 4, in which elements corresponding to those already described have been given the same reference numerals with the distinguishing suffix (b) added, avoids this kind of obvious tactic to defeat the system.

In accordance with this aspect of the invention, the battery indicia generates an information signal of predetermined magnitude in response to an initiating signal from the charger, and the charger is enabled only when the charger senses that the information signal is within the predetermined range. To this end, the indicia of the battery 11c includes both a conductive band 41 and an impedance 42 of predetermined value connecting the band 41 to one of the load terminals, in the illustrated case the negative terminal 13b. Enabling means is provided in the charger 10b which senses the magnitude of the impedance 42 and enables the charging mode only when the sensed impedance is within a predetermined range. Thus, a simple shorting of a sensing contact 43 with the charging terminal 17b will not enable the charging mode.

When the battery 11b is properly inserted in the charger 10b, the contact 43 makes electrical connection to the band 41 and a first or initiating signal in the form of an electrical current is sent from the charger 10b through the impedance 42. The impedance 42 is in series with a resistor 44, thus forming a voltage divider. The passage of current through the impedance 42 and the resistor 44 establishes a voltage at node 45 which is between the voltage of a source 46 and a line 47. The magnitude of the predetermined value of the impedance 42 thus determines the voltage at node 45. Accordingly, an information signal in the form of the voltage at node 45 is provided by the battery 11b to in the charger 10b. The value of the impedance 42 is selected to comprise a predetermined characteristic distinguishing the secondary battery 11b from batteries of the non-rechargeable primary type.

The voltage signal received by the charger in the form of the voltage at node 45 is sensed and evaluated for magnitude by enabling means within the charger. The enabling means is responsive to the information signal to permit or enable the delivery of charging current to the secondary battery 11b if the voltage information signal at node 45 is of the proper magnitude.

Figure 4:
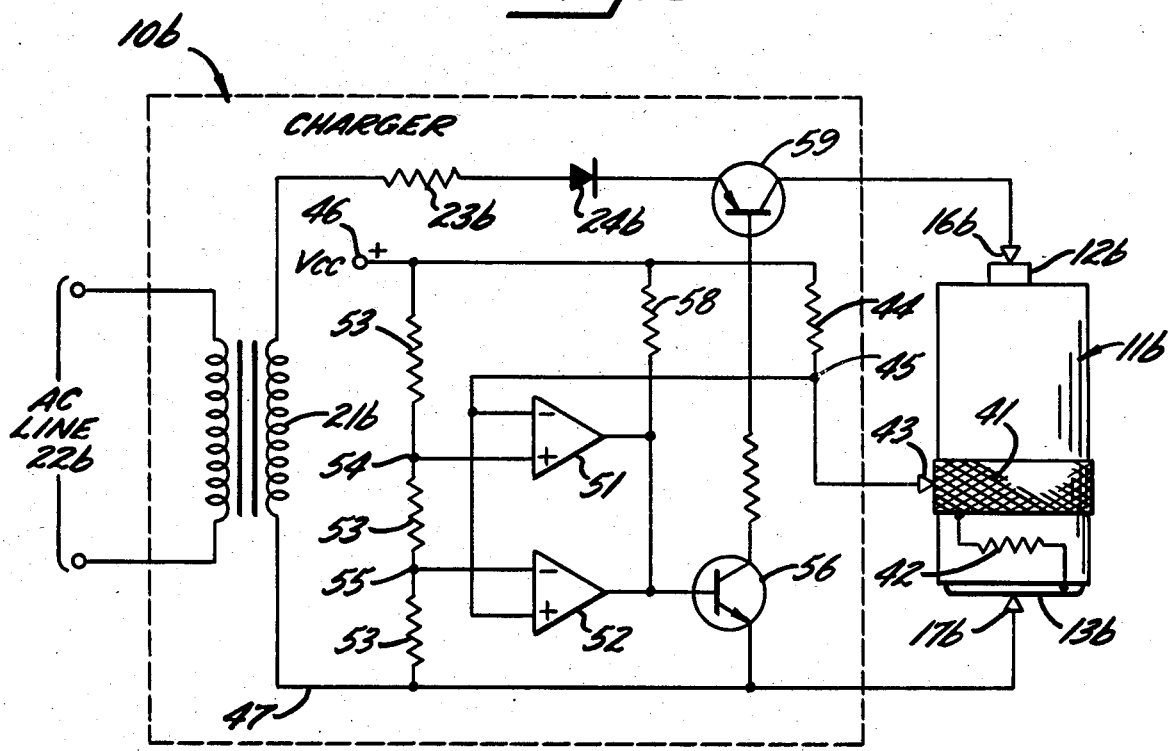
FIG. 4 is a schematic of a third embodiment of the battery charging system embodying the invention.

In the exemplary circuit shown in FIG. 4, the enabling means includes a pair of comparators 51 and 52 with outputs connected to the voltage source 46 through resistor 58 and with one input connected to a voltage divider comprising resistors 53 and with a second input connected to node 45. The node 45 is connected to the inverting terminal of comparator 51 and the non-inverting terminal of comparator 52. The voltage divider comprising resistors 53 is connected at node 54 to the non-inverting terminal of comparator 51 and at node 55 to the inverting terminal of the comparator 52. Accordingly, if the voltage at node 45 lies between the reference voltages, established by the fixed voltage divider, at nodes 54 and 55, then comparators 51 and 52 permit base current to transistor 56 which in turn permits a base current to transistor 58 to enable the flow of charging current to the battery. However, if there is no connection between the contact 43 and 17b, or if the impedance 42 is above the specified predetermined range, the information signal in the form of the voltage at the node 45 will be at a comparatively higher value. Under this condition the comparator 51 will deny base current to transistor 56 thereby switching off switch means in the form of transistor 56 and transistor 59 and preventing charging current to the battery. Similiarly, if a connection is made between the contact 43 and 17b, but the impedance 42 is less than the specified predetermined range, the voltage at node 45 will be comparatively lower. Under this condition the output of comparator 52 will deny base current to transistor 56, preventing base current to transistor 59, and thereby preventing transistor 59 from passing charging current to the battery.

We claim:

1. A battery charging system adapted to distinguish a rechargeable battery type from a nonrechargeable battery type, both said types being of substantially similar size, said system comprising, in combination:
   a rechargeable battery having first and second external load terminals for delivery electrical energy;
   indicia means on the rechargeable battery for providing an indication distinguishing said rechargeable battery from a non-rechargeable battery;
   a charging device including a battery charging circuit having a first non-charging mode and a second charging mode, said circuit having first and second charging contacts arranged for engagement with the first and second external load terminals respectively when said rechargeable battery is connected to the charger, said first and second charging contacts each engageable by one of a pair of load terminals of a non-rechargeable battery; and
   enabling means in said charging device for sensing the presence of the indicia means on the rechargeable battery and in response thereto enabling said charging mode, whereby the charger will be enabled to deliver charge current only by batteries of the rechargeable type.

2. The combination as set out in claim 1 in which said indicia means has a predetermined value, and said enabling means senses said value and responds only if that predetermined value is present.

3. The combination as set out in claim 1 further including means for isolating said indicia means from said external load terminals when said rechargeable battery is not residing in said charging device.

4. The invention as set forth in claim 3 wherein said enabling means comprises a pair of spaced-apart electrical contacts, and said indicia means comprises means for establishing electrical contact between said pair of electrical contacts to enable said charging mode.

5. The combination as set out in claim 1 wherein the indicia means includes a conductive strip on the exterior of the rechargeable battery positioned for sensing by the enabling means when the battery is connected to the charger.

6. The combination as set out in claim 5, wherein said conductive strip is electrically isolated from said external load terminals when said rechargeable battery is not residing in said charging device.

7. The combination as set out in claim 1 wherein the charging device includes means for accepting and charging a plurality of rechargeable batteries each having said indicia, and a similar plurality of enabling means for sensing the presence of said indicia on each battery and enabling said charging mode only when the indicia on all batteries is sensed.

8. The combination as set out in claim 1 wherein the indicia means includes a conductive strip on the battery and an impedance of predetermined magnitude in electrical connection with the conductive strip.

9. The combination as set out in claim 8 wherein the enabling means includes means for sensing the magnitude of the impedance and said charging mode is enabled only when the sensed magnitude of the impedance is within a predetermined range.

10. A rechargeable battery for use in a battery charging system having a battery charger which alternatively receives a rechargeable battery and a non-rechargeable battery, said charger adapted to deliver charging current to said rechargeable battery, said charger further having enabling means for switching the charger between a non-charging mode and a charging mode, said rechargeable battery comprising;
   a rechargeable battery of a size and configuration permitting said battery to be received by said charger which alternatively receives a non-rechargeable battery;
   a pair of load terminals for delivering current to a load;
   indicia means for activating the charger enabling means for charging of the rechargeable battery whereby only the rechargeable battery is adapted to energize the charger, thereby preventing delivery of charging current to non-rechargeable batteries; and
   means for isolating said indicia means from said external load terminals when said rechargeable battery is not residing in said charging device.

11. The invention as set forth in claim 10 wherein said enabling means comprises a pair of spaced apart electrical contacts and said indicia means includes means for establishing electrical contact between said pair of contacts to enable said charging mode.

12. The invention as set out in claim 10 wherein the indicia means includes a conductive strip on the exterior of the rechargeable battery positioned for sensing by the enabling means when the battery is connected to the charger.

13. The invention as set forth in claim 12 further including means for isolating said indicia means from said load terminals when said rechargeable battery is not residing in said charging device.

14. The invention as set out in claim 10 wherein the indicia means includes a conductive strip on the battery and an impedance of predetermined magnitude connected between the conductive strip and one of the battery load terminals.

15. The combination as set out in claim 14 wherein said predetermined magnitude of impedance activates said charger enabling means only when the sensed magnitude of the impedance is within a predetermined range.

16. A battery charging system adapted to distinguish between rechargeable secondary and non-rechargeable primary batteries of substantially similar size and configuration, comprising in combination:
   a charging device including a battery charging circuit for delivering charging current to a received battery;
   a rechargeable secondary battery having load terminals for delivering electrical energy;
   means for providing an initiating signal to a battery received in said charging device;
   means associated with said rechargeable secondary battery for generating and transmitting to said charging device an information signal in response to said initiating signal; and
   means associated with said charging device for permitting the delivery of charging current to fully charge the rechargeable secondary battery only in response to said information signal from said rechargeable secondary battery, said permitting means further including means for preventing the delivery of charging current to a battery of the non-rechargeable type not providing said information signal.

17. The invention as set forth in claim 16 wherein said charge permitting means includes means for evaluating said information signal for magnitude and permitting the delivery of said charging current only if the information signal is of the proper magnitude.

18. The invention as set forth in claim 17 further including means for generating a reference signal and wherein said evaluating means includes comparison means for comparing said information signal to said reference signal and permits the delivery of charging current to said rechargeable secondary battery in response to said comparison.

19. The invention as set forth in claim 16 wherein said charge permitting means includes switch means responsive to said information signal to permit the delivery of said charging current to said rechargeable secondary battery.

20. The invention as set forth in claim 19 wherein said charge permitting means includes means for evaluating said information signal by comparing said information signal with a reference signal generated in said charging device, said switch means further including switch means actuable in response to said comparison to permit the delivery of said rechargeable charging current to said secondary battery.

21. A rechargeable battery for use in a battery charging system having a battery charger which alternatively receives a rechargeable battery and a non-rechargeable battery, said charger adapted to deliver charging current to said rechargeable battery, said charger further having enabling means for switching the charger between a non-charging mode and a charging mode, said rechargeable battery comprising;
   a rechargeable battery of a size and configuration permitting said battery to be received by said charger which alternatively receives a non-rechargeable battery;
   a pair of load terminals for delivering current to a load; and
   indicia means for activating the charger enabling means for charging of the rechargeable battery whereby only the rechargeable battery is adapted to energize the charger and for permitting charging current to flow through said rechargeable battery via a current path other than through said indicia means.

22. A rechargeable battery for use in a battery charging system having a battery charger which alternatively receives a rechargeable battery and a non-rechargeable battery, said charger adapted to deliver charger current to said rechargeable battery, said charger further having enabling means for switching the charger between a non-charging mode and a charging mode, said rechargeable battery comprising:
   a rechargeable battery of a size and configuration permitting said battery to be received by said charger which alternatively receives a non-rechargeable battery;
   a pair of load terminals for delivering current to a load; and
   indicia means for activating the charger enabling means for charging of the rechargeable battery whereby only the rechargeable battery is adapted to energize the charger, thereby preventing delivery of charging current to non-rechargeable batteries and permitting the delivery of charging current to said load terminals of said rechargeable battery, said load terminals receiving said charging current directly from said battery charger.

23. A battery charging system adapted to distinguish a rechargeable battery type from a non-rechargeable battery type, both said types being of substantially similar size, said system comprising, in combination:
   a rechargeable battery having first and second external load terminals for delivering electrical energy;
   indicia means on the rechargeable battery for providing an indication distinguishing said rechargeable battery from a non-rechargeable battery;
   a charging device including a battery charging circuit having a first non-charging mode and a second charging mode, said circuit having first and second charging contacts; and
   enabling means in said charger for sensing the presence of the indicia means of the rechargeable battery and in response thereto for enabling the flow of charging current through said rechargeable battery via a current path other than through said indicia means, whereby the charger will be enabled to deliver charge current only by batteries of the rechargeable type.

24. A battery charging system adapted to distinguish a rechargeable battery type from a non-rechargeable battery type, both of said types being of substantially similar size, said system comprising, in combination:
- a rechargeable battery having first and second external load terminals for delivering electrical energy;
- indicia means on the rechargeable battery for providing a signal distinguishing said rechargeable battery from a non-rechargeable battery;
- a charging device including a battery charging circuit having a first non-charging mode and a second charging mode; and
- enabling means in said charging circuit of said charging device for enabling said circuit to operate in said second charging mode, said enabling means including a switch disposed within said charging device and connected in said charging circuit, said switch having a first non-conducting mode for maintaining said circuit in said first non-charging mode and a second conducting mode for maintaining said circuit in said second charging mode respectively, said switch operable in said second conducting mode in response to said signal from said indicia means.

25. A battery charging system adapted to distinguish a rechargeable battery type from a non-rechargeable battery type, both said types being of substantially similar size, said system comprising, in combination:
- a rechargeable battery having first and second external load terminals for delivering electrical energy;
- indicia means on the rechargeable battery for providing an indication distinguishing said rechargeable battery from a non-rechargeable battery;
- means disposed on said rechargeable battery for isolating said indicia means from said external load terminals when said rechargeable battery is not residing in said charging device;
- a charging device including a battery charging circuit having a first non-charging mode and a second charging mode; and
- enabling means in said charging device for sensing the presence of the indicia means on the rechargeable battery and in response thereto enabling said charging mode.

* * * * *